(12) United States Patent
Serota

(10) Patent No.: US 8,577,427 B2
(45) Date of Patent: Nov. 5, 2013

(54) HEADSET WITH ADJUSTABLE DISPLAY AND INTEGRATED COMPUTING SYSTEM

(76) Inventor: Lee Serota, Oswego, IL (US)

( * ) Notice: Subject to any disclaimer, the term of this patent is extended or adjusted under 35 U.S.C. 154(b) by 0 days.

(21) Appl. No.: 13/603,216

(22) Filed: Sep. 4, 2012

(65) Prior Publication Data

US 2013/0237146 A1 Sep. 12, 2013

Related U.S. Application Data

(60) Provisional application No. 61/608,307, filed on Mar. 8, 2012, provisional application No. 61/645,303, filed on May 10, 2012.

(51) Int. Cl.
*H04M 1/00* (2006.01)

(52) U.S. Cl.
USPC ............. 455/575.2; 345/8; 379/430; D14/204

(58) Field of Classification Search
USPC ............. 455/575.2, 575.1, 550.1, 8; 379/430; D14/204, 372, 233; 381/74, 376
See application file for complete search history.

(56) References Cited

U.S. PATENT DOCUMENTS

| | | | |
|---|---|---|---|
| 6,157,291 A * | 12/2000 | Kuenster et al. ................... 345/8 |
| 6,378,390 B2 * | 4/2002 | Saito ............................... 74/159 |
| 6,496,161 B1 * | 12/2002 | Tanaka ............................. 345/8 |
| 2002/0190923 A1 * | 12/2002 | Ronzani et al. ................. 345/50 |
| 2010/0245585 A1 * | 9/2010 | Fisher et al. ................... 348/164 |
| 2010/0295754 A1 * | 11/2010 | Cernasov et al. ................. 345/8 |
| 2010/0328204 A1 * | 12/2010 | Edwards et al. ............... 345/157 |
| 2011/0267439 A1 * | 11/2011 | Chen et al. ...................... 348/53 |
| 2011/0273365 A1 * | 11/2011 | West et al. ........................ 345/8 |
| 2012/0050144 A1 * | 3/2012 | Morlock ............................ 345/8 |
| 2012/0235900 A1 * | 9/2012 | Border et al. ................. 345/156 |

* cited by examiner

*Primary Examiner* — Nay A Maung
*Assistant Examiner* — Angelica M Perez

(57) ABSTRACT

The adjustable headset is an all in one device that include an adjustable support band, an adjustable screen, a first and second ear cover, a computer system, a communications system, and a power source. The adjustable support band connects to each ear cover, allowing the virtual goggles to rest atop a user's head, with the ear covers being adjacent to a user's ears. The screen is attached to the ear covers by adjustable screen bars, which allow a user to change the distance, angle, and general orientation of the screen. The computer system is capable of storing and running software programs, such as an operating system, as well as interfacing with connected devices by means of a set of connection ports, located on the ear covers, or the communications system. Thus the virtual goggles serve to adjust to meet individual comfort needs and interface with a wide variety of technologies.

12 Claims, 13 Drawing Sheets

HEADSET WITH ADJUSTABLE DISPLAY AND INTEGRATED COMPUTING SYSTEM

The current application claims a priority to the U.S. Provisional Patent application Ser. No. 61/608,307 filed on Mar. 8, 2012 and to the U.S. Provisional Patent application Ser. No. 61/645,303 filed on May 10, 2012.

FIELD OF THE INVENTION

The present invention relates generally to an apparatus for integrating computer capabilities into headgear. More specifically, the present invention provides a headset with an integrated computer system, supported and connected to a display. This allows a user to treat the present invention as a portable and hands-free computer and display.

BACKGROUND OF THE INVENTION

There are currently many devices, including headgear, which incorporate computer functionality. These devices take many forms, from helmets to goggles and glasses, essentially providing users with portable, lightweight, and convenient systems. Others provide enhanced viewing experience for multimedia, whether playing games or watching movies. However, while current products provide specific features, many of them are narrow in focus. Some current solutions are meant purely for movies and video, lacking the capability to be used for productivity. Some devices are capable of playing games, but only in the sense that they connect to a dedicated console; the devices themselves only serve as displays and are incapable of independently running and displaying games. There are even some solutions which are very narrow in scope, being integrated into medical devices or helmets, displaying video from a camera or providing wireless communication methods, such as radio. They are only capable of limited functions, or restricted in regards to the devices they can interact with. It is therefore an object of the present invention to provide a computerized headgear which is capable of connecting to a variety of devices, as well as providing multimedia, computing, and accessory functions. It is a further object of the present invention to serve as an all-in-one device capable of serving as an entertainment platform, office tool, and more.

The present invention combines basic computer capabilities with an advanced display and multimedia environment. Numerous connection methods and tertiary features are included to ensure the present invention is a useful product regardless of the situation and location users may find themselves.

DETAIL DESCRIPTIONS OF THE INVENTION

Figure 1:
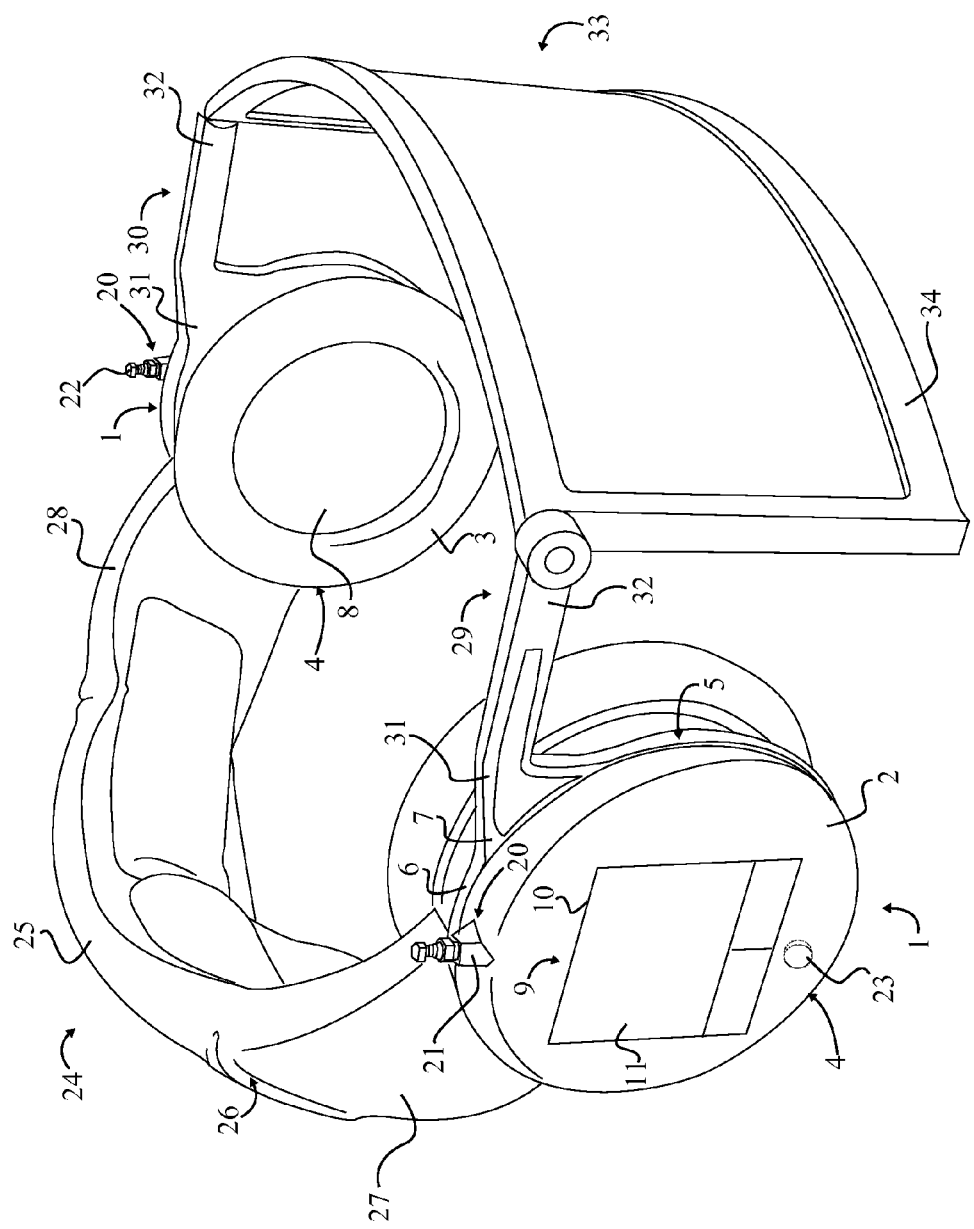
FIG. 1 is a perspective view of the present invention.
Figure 2:
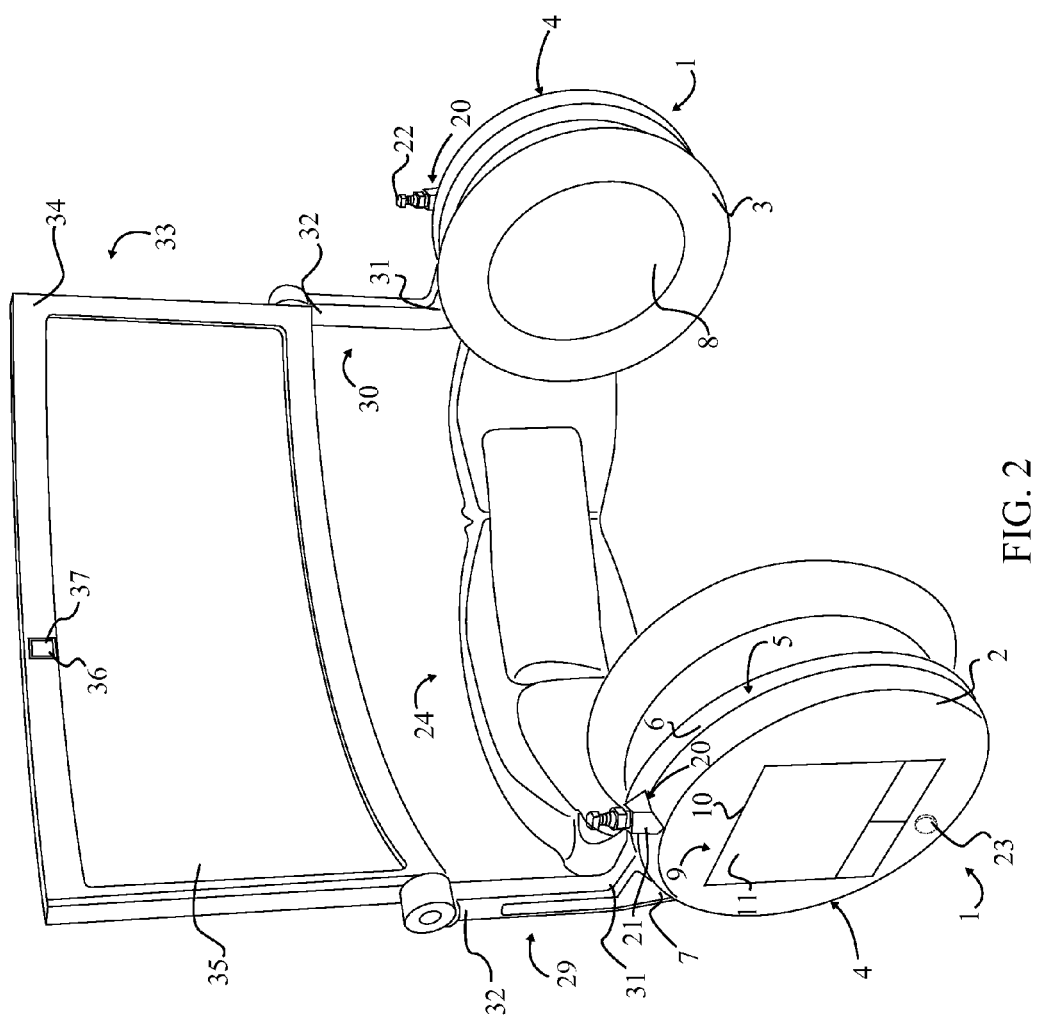
FIG. 2 is a perspective view of the present invention in another configuration.
Figure 3:
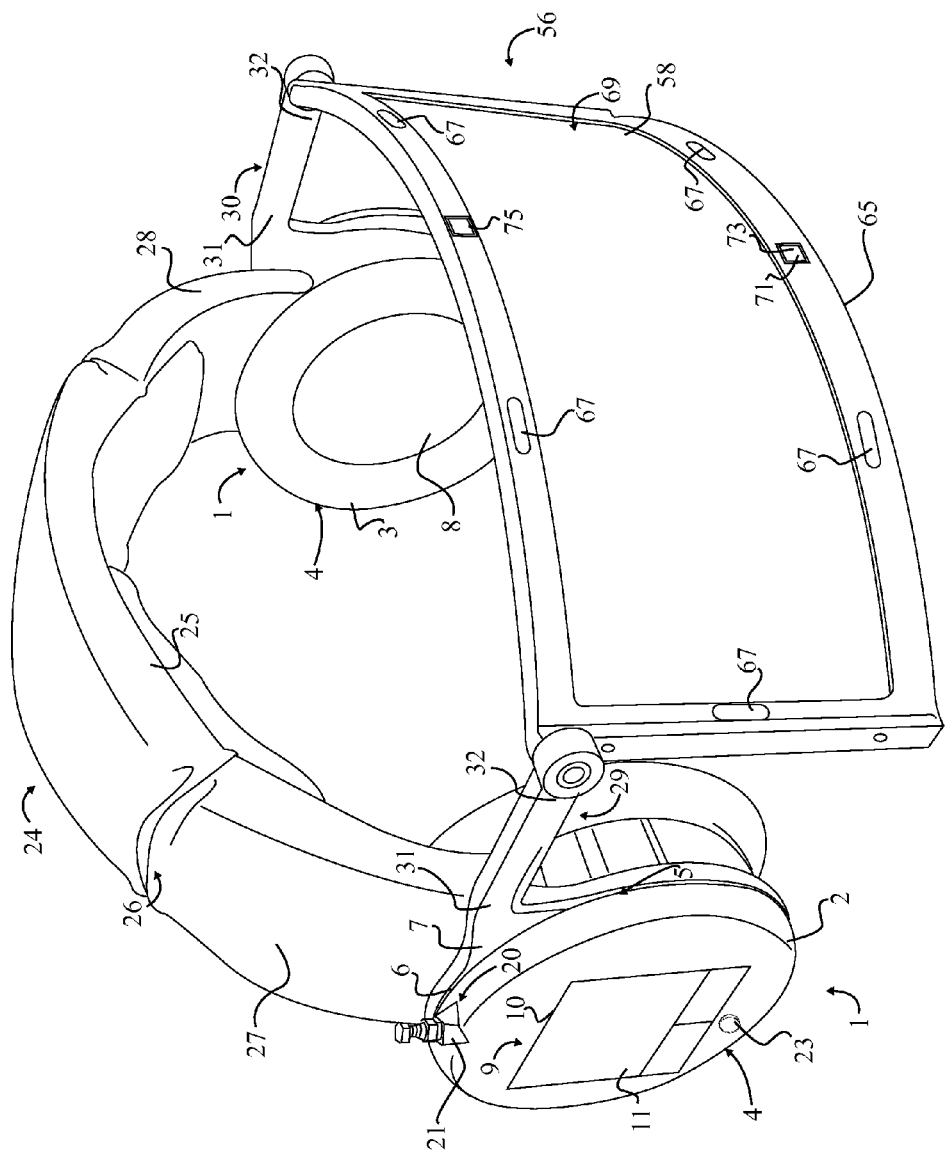
FIG. 3 is a perspective view of another embodiment of the present invention.
Figure 4:
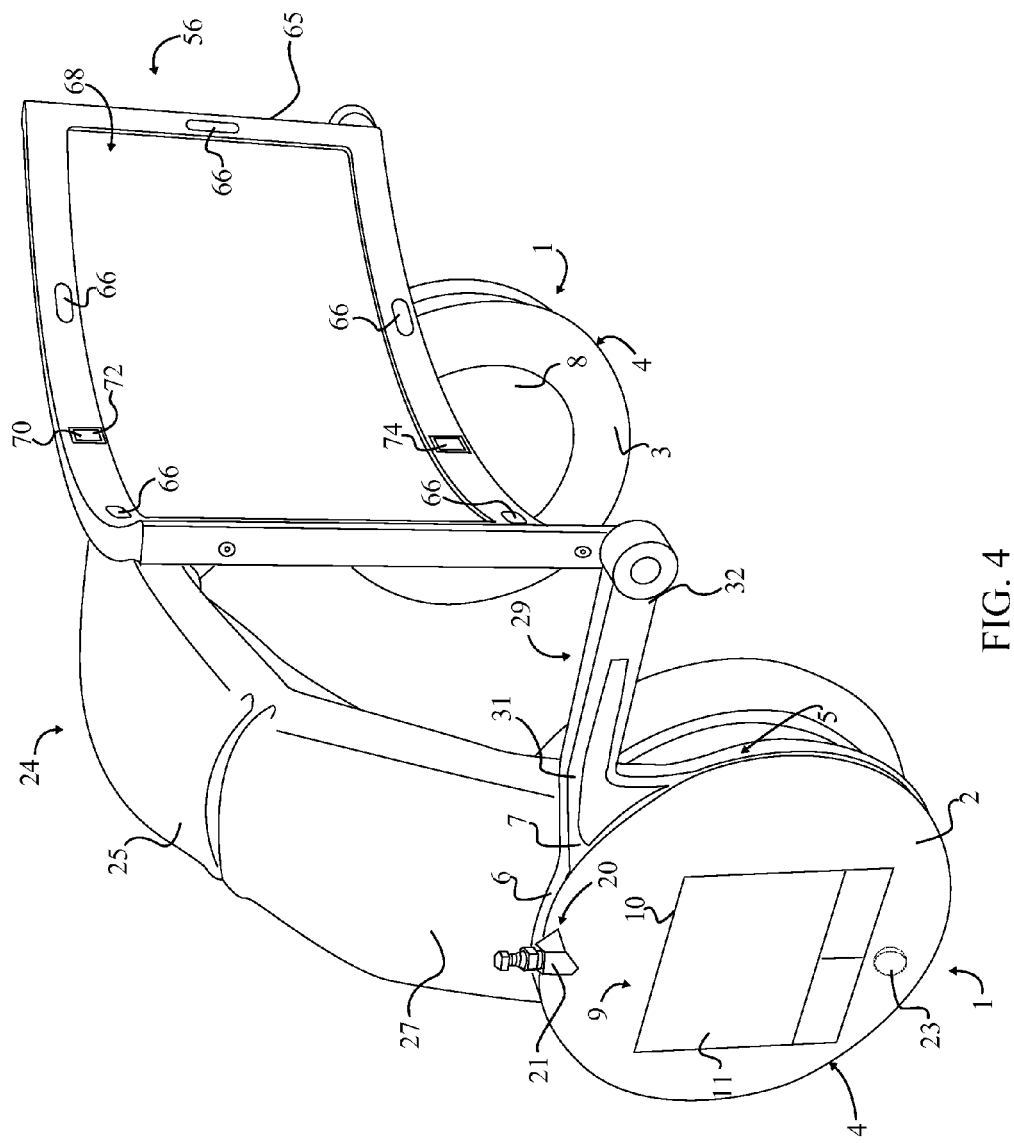
FIG. 4 is a perspective view of another embodiment of the present invention in another configuration.

All illustrations of the drawings are for the purpose of describing selected versions of the present invention and are not intended to limit the scope of the present invention.

The present invention is a computerized display system built into headgear. The present invention, as seen in FIG. 1, FIG. 2, FIG. 3, FIG. 4, and FIG. 5, comprises a pair of ear covers 1, an adjustable support band 24, a first screen bar 29, a second screen bar 30, a screen 33, a computer system 39, a communications system 43, and a power source 51. The adjustable support band 24 connects the first ear cover 2 and the second ear cover 3, allowing the adjustable support band 24 to rest atop a user's head while the first ear cover 2 and second ear cover 3 rest against a user's ears. The first screen bar 29 is connected to the first ear cover 2, while the second screen bar 30 is connected to the second ear cover 3. The first screen bar 29 and second screen bar 30 are extendable. In addition, the first screen bar 29 and the second screen bar 30 can be rotated in relation to the first ear cover 2 and second ear cover 3. The screen 33 is connected to the first screen bar 29 and the second screen bar 30, such that the screen 33 can rotate down, wherein the screen 33 faces the adjustable support band 24, or up, wherein the screen 33 faces away from the adjustable support band 24. The computer system 39, communications system 43, and power source 51 are all contained with the present invention, with individual subcomponents housed within the first ear cover 2 or second ear cover 3. The power source 51 provides sufficient power to run the screen 33, computer system 39, and communications system 43, as well as any auxiliary devices included. The computer system 39 is connected to the screen 33 and communications system 43, allowing the computer system 39 to output a visual interface, as well as any relevant information, to the screen 33.

The pair of ear covers 1 comprises a first ear cover 2 and a second ear cover 3. The first ear cover 2 and second ear cover 3 each comprise an enclosure 4, an annular screen rail 5, a speaker 8, a control interface 9, a set of connection ports 12, and an antenna 20, as illustrated in FIG. 1, FIG. 2, FIG. 3, and FIG. 4. The enclosure 4 preferably has a cylindrical shape, being wide enough to cover an ear. The speaker 8 is located on an interior face of the enclosure 4, where it would be adjacent to a user's ear while the present invention is being worn. The speakers 8 also include a padding around the speaker 8 perimeter to cushion a user's ear against the ear covers 1 and to increase user comfort. On an exterior face, opposite the speaker 8, is where the control interface 9 is positioned. The control interface 9 allows a user to interact with the present invention while wearing it, simply by using a free hand to send commands through the control interface 9. The control interface 9 comprises an input housing 10 and an input device 11. The input housing 10 is recessed into the enclosure 4 and holds the input device 11. The input device 11 is preferably a touchpad with mouse buttons, similar to that used with laptops. In addition, it is preferable that the input device 11 can be removed from the input housing 10 and used remotely, sending commands to the computer system 39 by means of the communications system 43. The annular screen rail 5 is positioned on the annular face of the enclosure 4 and comprises a track 6 and guide slider 7. The guide slider 7 is restrained to the track 6, but is free to move along the track 6. The guide slider 7 (of the first ear cover 2 and the second ear cover 3) serves as a connection point for the first screen bar 29 and second screen bar 30 (respectively), allowing the angle between the adjustable support band 24 and the first screen bar 29 and second screen bar 30 to be adjusted. This allows a user to rotate the first screen bar 29 and second screen bar 30 such that the adjustable support band 24 is either above or behind a user's head, visible in FIG. 1 and FIG. 2. The antenna 20 is rotatably connected to the enclosure 4, allowing it to be adjusted to provide better reception as necessary. Preferably, the antenna 20 is also telescoping, such that it may be extended to improve reception or retracted to increase the visual appeal of the current invention.

Figure 6:
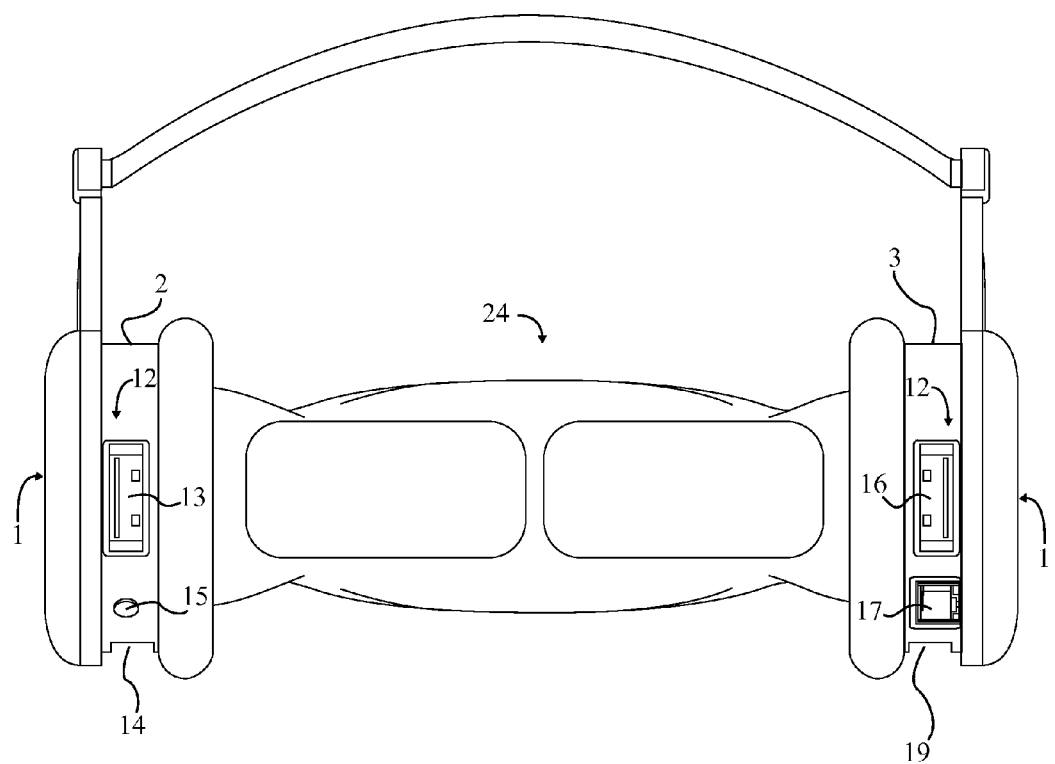
FIG. 6 is a bottom view of the present invention.
Figure 7:
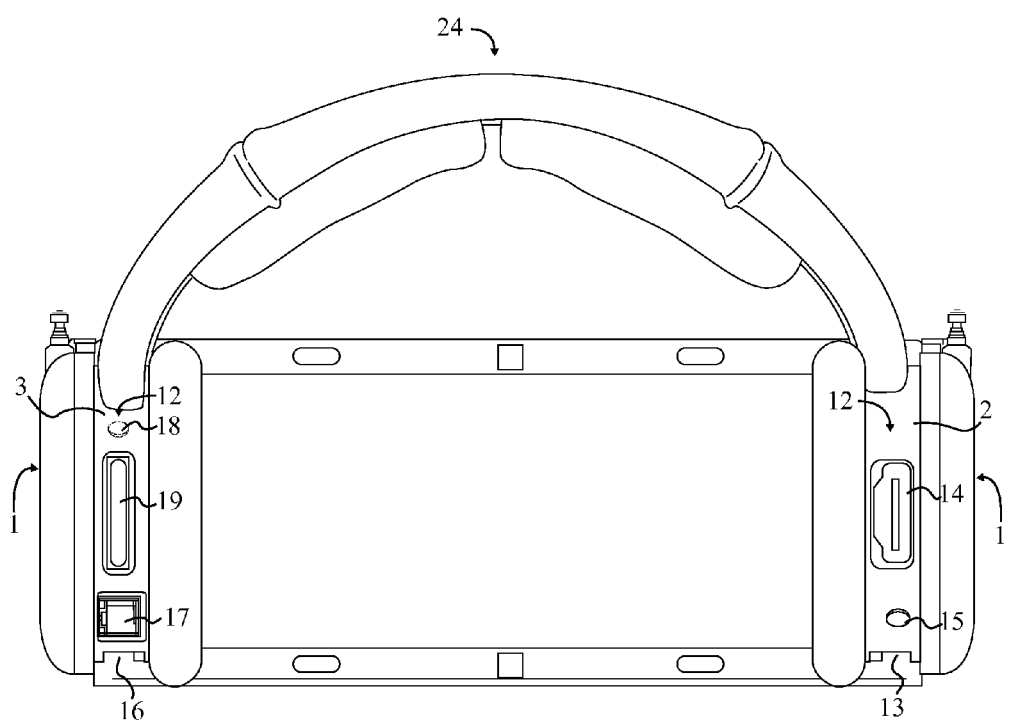
FIG. 7 is a rear view of the present invention.
Figure 12:
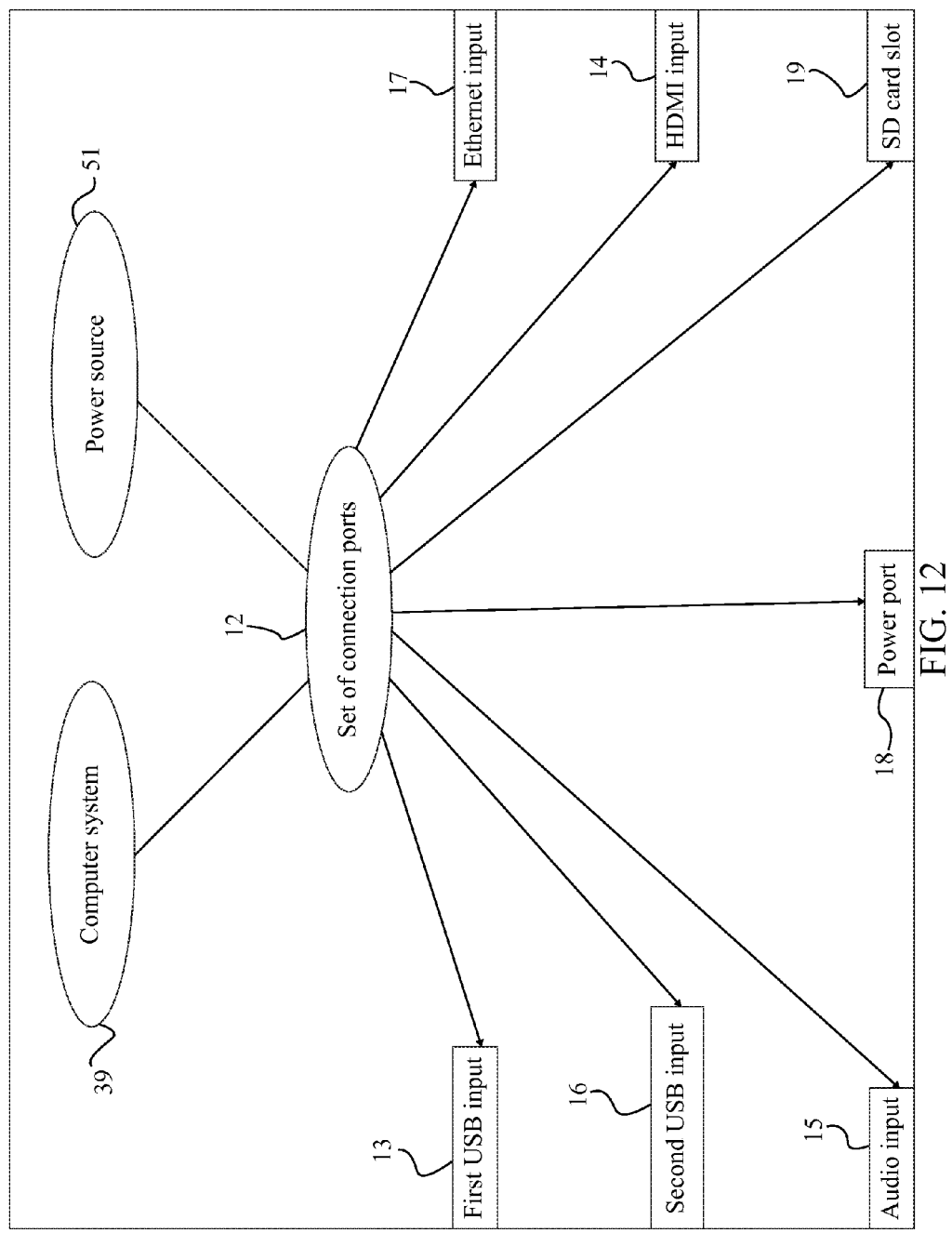
FIG. 12 is another graphic showing electrical and electronic connections of the present invention.

Shown in FIG. 6, FIG. 7, and FIG. 12, the set of connection ports 12 on the first ear cover 2 comprises a first Universal Serial Bus (USB) input 13, a High-Definition Multimedia Interface (HDMI) input 14, and an audio input 15. The set of connection ports 12 on the second ear cover 3 comprises a second USB input 16, an Ethernet input 17, a power port 18, and a Secure Digital (SD) card slot 19. Each set of connection ports 12 is powered by the power source 51 and in communication with the computer system 39, allowing the present invention to make use of external accessories like flash drives, printers, and external displays such as monitors. The antenna 20 of the first ear cover 2 is preferably a television antenna 21, allowing the present invention to receive television broadcasts, while the antenna 20 of the second ear cover 3 is preferably a satellite antenna 22 allowing the present invention to receive satellite signals. The enclosures 4 are protected by a waterproof coating, such as polyurea, to help prevent water from leaking into and damaging the electronic components.

In other embodiments the annular screen rail 5 could instead be connected to the adjustable support band 24, resulting in the first screen bar 29 and second screen bar 30 being fixed while the adjustable support band 24 can be rotated around the pair of ear covers 1. It is also possible for the speakers 8 to be positioned away from a user's ears, rather than adjacent to said ears. However, this would likely decrease user comfort and also allow other persons in proximity to hear sound from the speakers 8, reducing privacy of the user. Other possible alterations include allowing the first ear cover 2 and second ear cover 3 where they connect to the adjustable support band 24. This would allow the first ear cover 2 and second ear cover 3 to rotate until they are flat, such that the speaker 8 could rest on a flat surface like a table. This would allow the ear covers 1 to serve as stands for the present invention, letting a user interact with the present invention even while not wearing it.

The adjustable support band 24 is worn on the head, supporting the present invention on a user's head as well as securing the first ear cover 2 to the second ear cover 3. The adjustable support band 24 comprises a main section 25, a first end section 27, and a second end section 28. The main section 25 comprises a main rail 26, which is internal to the main section 25. The main rail 26 runs the length of the main section 25, protruding from a first end and second end of the main section 25. The main rail 26 inserts to the first end section 27 and second end section 28, connecting the first end section 27 to the first end of the main section 25. Similarly, the main rail 26 connects the second end section 28 to the second end of the main section 25. In this manner the first end section 27 and second end section 28 may be moved closer to or away from the main section 25, simply by sliding along the main rail 26. This allows a user to alter the length of the adjustable support band 24 to better support their individual head size. The adjustable support band 24 also helps to secure the other components of the present invention; the first ear cover 2 is attached to the first end section 27 opposite the main section 25 just as the second ear cover 3 is attached to the second end section 28 opposite the main section 25. The main section 25, first end section 27, and second end section 28 each include padding on a bottom surface. The padding serves as a soft layer between the adjustable support band 24 and a user's head, increasing user comfort. The main section 25, first end section 27, and second end section 28 each also include a waterproof coating over an exterior upper surface. This waterproof coating can be made from a variety of materials, such as polyurea, and serves to repel water and help protect internal components, especially electrical components, from water damage.

In other embodiments the adjustable support band 24 may use an adjustment method other than the main rail 26 system. For example, the first end section 27 and second end section 28 could be connected to the main section 25 by a compressible material, similar to the bellows of an accordion. Another possible addition is the inclusion of intermediate sections. These intermediate sections could provide finer adjustments to the curve of the adjustable support band 24. The first end section 27 and second end section 28 could also be rotatably attached to the first ear cover 2 and second ear cover 3, respectively, allowing the adjustable support band 24 to rotate just as the screen 33 is capably of rotating, examples of which can be seen in FIG. 1, FIG. 2, FIG. 3, and FIG. 4.

The first screen bar 29 and the second screen bar 30 each comprise a support end 31 and a screen end 32. The screen end 32 serves as an attachment point for the screen 33 and is capable of sliding into the support end 31. By sliding the screen end 32 into or out of the support end 31, a user can adjust the distance of the screen 33 in relation to their face. The screen 33 could be moved closer for watching multimedia or other applications where an immersive environment is desirable, while the screen 33 could be moved away for office work or similar situations, where it would be beneficial to be able to see papers on a desk by simply glancing down rather than having to remove or flip the screen 33. The support end 31 connects to the guide slider 7 on the annular screen rail 5, allowing the first screen bar 29 and second screen bar 30 (and as a result, the screen 33 itself), to be move along the track 6.

In other embodiments the first screen bar 29 and second screen bar 30 could include an auxiliary support to assist the adjustable support band 24. This auxiliary support could be applied in a variety of manners, such as a chin strap that is connected to the support end 31 of the first screen bar 29 and to the support end 31 of the second screen bar 30. A nose bridge could also be connected to the first screen bar 29 and second screen bar 30, acting in a similar manner as does the bridge in glasses, although care must be taken so that the bridge does not interfere with the view of a user. The first screen bar 29 and second screen bar 30 could include additions for purposes other than added support. A side cover, taking the form of removable plates or a simple curtain, could be attached to the first screen bar 29 and the second screen bar 30 rail. These covers would serve to reduce the amount of light reaching a user and improve the user's experience when watching movies or engaging in similarly immersive applications.

The screen 33 comprises a bezel 34, a protective cover 35, a webcam 36, a microphone 37, and an accelerometer 38. The bezel 34 serves as the connection point between the screen 33, the first screen bar 29, and the second screen bar 30. The screen 33 is rotatable, allowing it to be used with the screen 33 facing towards the adjustable support band 24, for standard use, or away from the adjustable support band 24, ideal for when the present invention is not being worn but rather being supported on a surface. The protective cover 35 is preferably a transparent static antiray cover, which offers some protection against user headaches but still allows the screen 33 to be viewed. The protective cover 35 can be removed and used with other displays if so desired. The screen 33 itself is preferably a capacitive touch display with a "high definition" resolution (at least 1920 by 1080 pixels) and is capable of auto stereoscopic three-dimensional display. Rotating, or flipping, the display screen 33 to a use position or an up position would allow a person to leave the present invention on while walking around. A user could simply flip the display screen 33 up so that it does not obstruct a user's field of view. When a user wants to view the display screen 33, they could simply flip the screen 33 down to return it to a use position. A user could even rotate the display screen 33 180 degrees, flipping it to a reverse position. In this configuration the display screen 33 would be facing away from the headgear base 53. This would allow a user to remove the present invention and still utilize the display screen 33. Since the display screen 33 is a capacitive touch screen 33, a user could control the present invention using only their finger, similar to how many smart phones and similar devices are used. The webcam 36 and the speaker 8 are located on the bezel 34 of the screen 33. The webcam 36 should be located on the bezel 34 near the bottom section of the screen 33 (in the reference frame of the present invention being worn and the screen 33 facing a user). The microphone 37 is preferably merged with the webcam 36, sharing the same position. Though the microphone 37 can be placed outside the bezel 34, this may result in the microphone 37 interfering with a user's face when the screen 33 in a proximal position. The accelerometer 38 allows the screen 33 to detect its orientation and to adjust display settings as necessary.

In other embodiments the display screen 33 could utilize smaller or larger resolutions, or use stereoscopic methods to display three-dimensional media. The screen 33 could also be removed and replaced with a separate display, such as a portable display. Due to the large variation in sizes and layouts this would require the inclusion of an adapter to interface various portable displays with the present invention. Ideally, an added device would attach to the first screen bar 29 and second screen bar 30, allowing the added device to rotate in the same manner as the default screen 33 does. The adapter ideally allows the added device to make use of the computer system 39 and communications system 43 of the present invention, or simply using those available in the added device if that is preferred, and assuming the device is capable.

Figure 10:
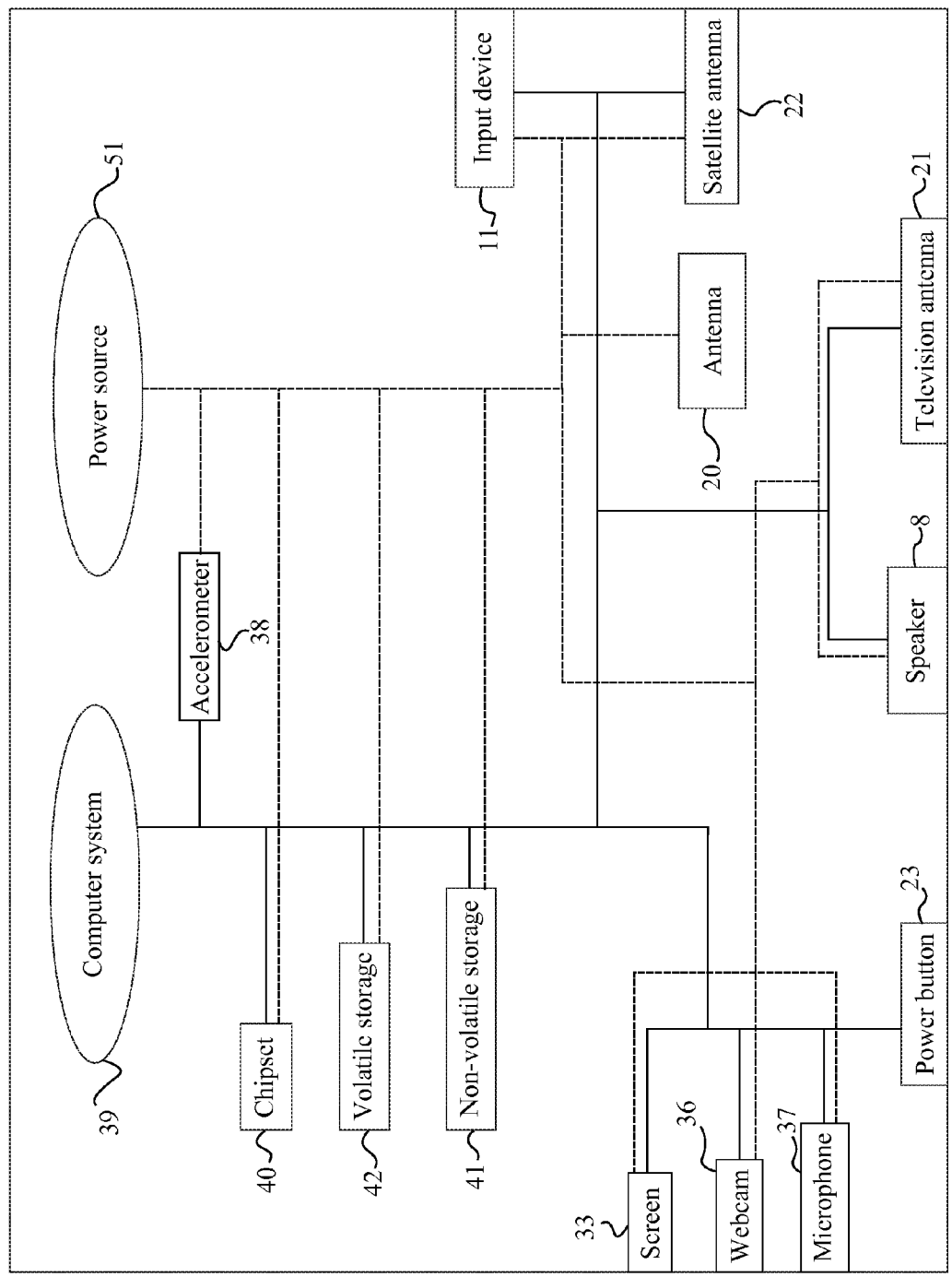
FIG. 10 is a graphic showing electrical and electronic connections of the present invention.

The computer system 39, depicted in FIG. 10, comprises a chipset 40, a non-volatile storage 41, and a volatile storage 42. The chipset 40 can run instructions, allowing the present invention to utilize software and operating systems. The non-volatile storage 41 allows the present invention to install an operating system and software programs. The volatile storage 42 allows the present invention to use programs at faster speeds. In the preferred embodiment, the non-volatile storage 41 will utilize NAND flash while the volatile storage 42 will use random access memory, preferably DDR3 SDRAM. In combination, these three components allow the present invention to effectively run an operating system (such as Android™) and other programs. The computer system 39 is in communication with all other electronic devices of the system, including the communications system 43, set of inputs, screen 33, and antennas 20. This allows the computer system 39 to interact with all other components as well as output information, such as a visual interface, to the screen 33. The computer system 39 is preferably housed with either the first ear cover 2 or the second ear cover 3, although it could also be split across both if desired.

In other embodiments the computer system 39 could include additional specialized components. For example, the computer system 39 could include a dedicated graphics or sound module, to provide better quality video and audio to users. However, such additions come at the price of increased power usage and may not provide a significant enough increase in performance to justify the higher power requirements. Ideally, the preferred computer system 39 will be capable of performing basic tasks such as video playback and word processing.

Figure 11:
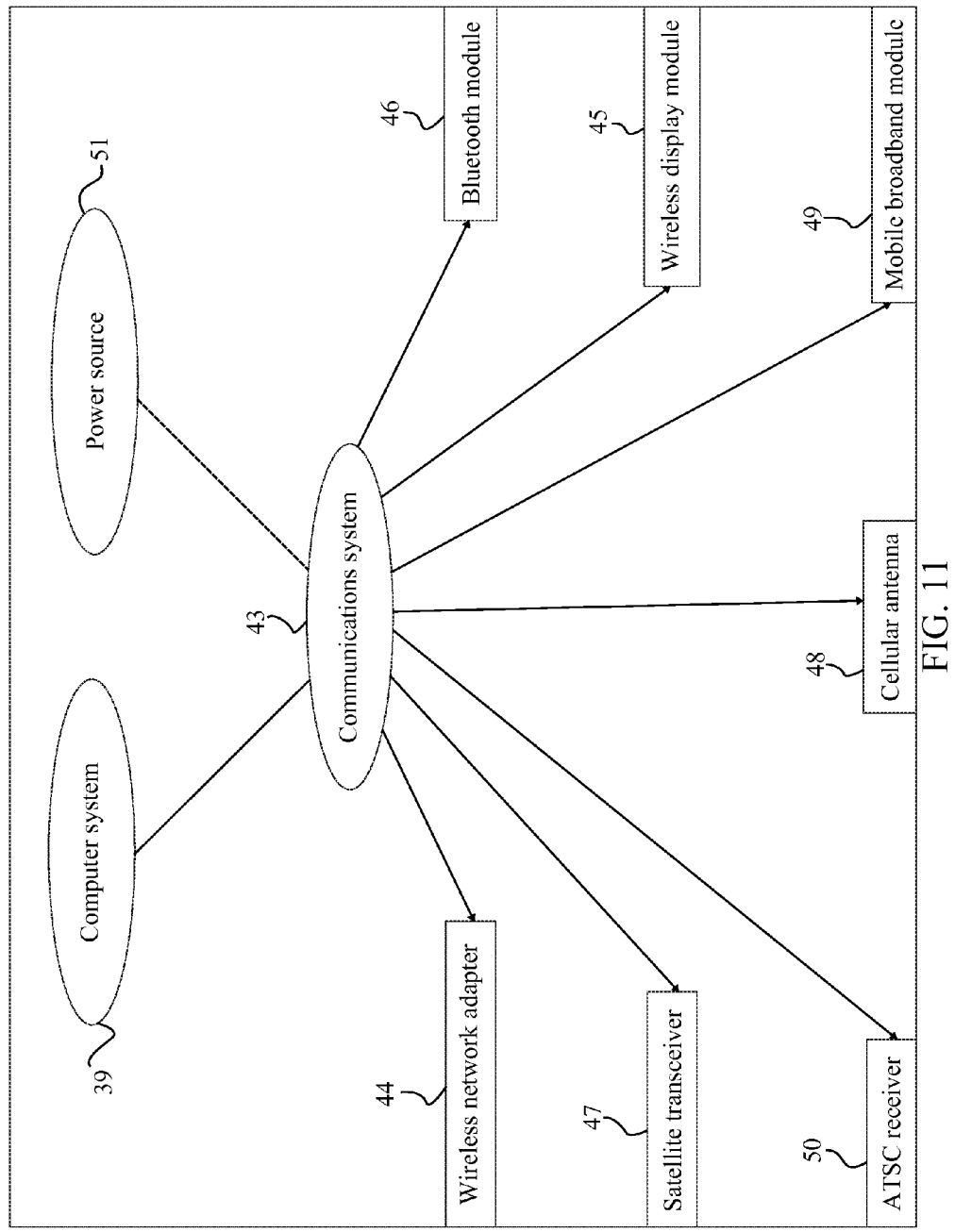
FIG. 11 is another graphic showing electrical and electronic connections of the present invention.

Shown in FIG. 11, the communications system 43 comprises a wireless network adapter 44, a wireless display module 45, a Bluetooth module 46, a satellite transceiver 47, a cellular antenna 48, a mobile broadband module 49, and an Advanced Television Systems Committee (ATSC) receiver 50. The ATSC receiver 50 communicates with the television antenna 21 of the first ear cover 2, allowing the present invention to play certain television broadcasts picked up by the television antenna 21. Likewise, the satellite transceiver 47 communicates with the satellite antenna 22 of the second ear cover 3, allowing the present invention to send and receive information over satellite networks, enabling the use of features such as GPS. The wireless network adapter 44 allows the present invention to connect to nearby networks (generally 802.11, as well as devices connected to those networks), while the Bluetooth module 46 allows other Bluetooth enabled devices, such as some console controllers, remotes, and smart phones, to interface with the present invention. The wireless display module 45 allows the present invention to output information to a compatible external display, such as a television; this feature can be replicated using the HDMI connection if a compatible external display is not available. The cellular antenna 48 allows the present invention to operate over cell networks, while the embedded mobile broadband module 49 allows the present invention to utilize the broadband internet access provided by cellular companies, such as 3G. The mobile broadband module 49 provides a larger area of network coverage, useful if there are no proximal wireless networks. As with the computer system 39, the communications system 43 can be housed with the first ear cover 2, the second ear cover 3, or split between both. Ideally the ATSC receiver 50 will be positioned adjacent to the television antenna 21, house within the first ear cover 2. Likewise, the satellite transceiver 47 will be housed within the second ear cover 3, adjacent to the satellite antenna 22.

Other embodiments could make use of additional communication standards, such as radio. Standards yet to be developed could also be incorporated as they are finalized and released.

Another embodiment of the present invention is also possible. In this other embodiment, the screen 33 is replaced with an independently functioning tablet 56 as well as a tablet housing 78 which is connected to the first screen bar 29 and the second screen bar 30. The tablet 56 slides into and out of the tablet housing 78, allowing the tablet 56 to be used independently or in conjunction with the ear covers 1 and adjustable support band 24 components of the present invention. In addition, a charging dock 52 is provided that can support the tablet 56 and provide power to it.

Figure 13:
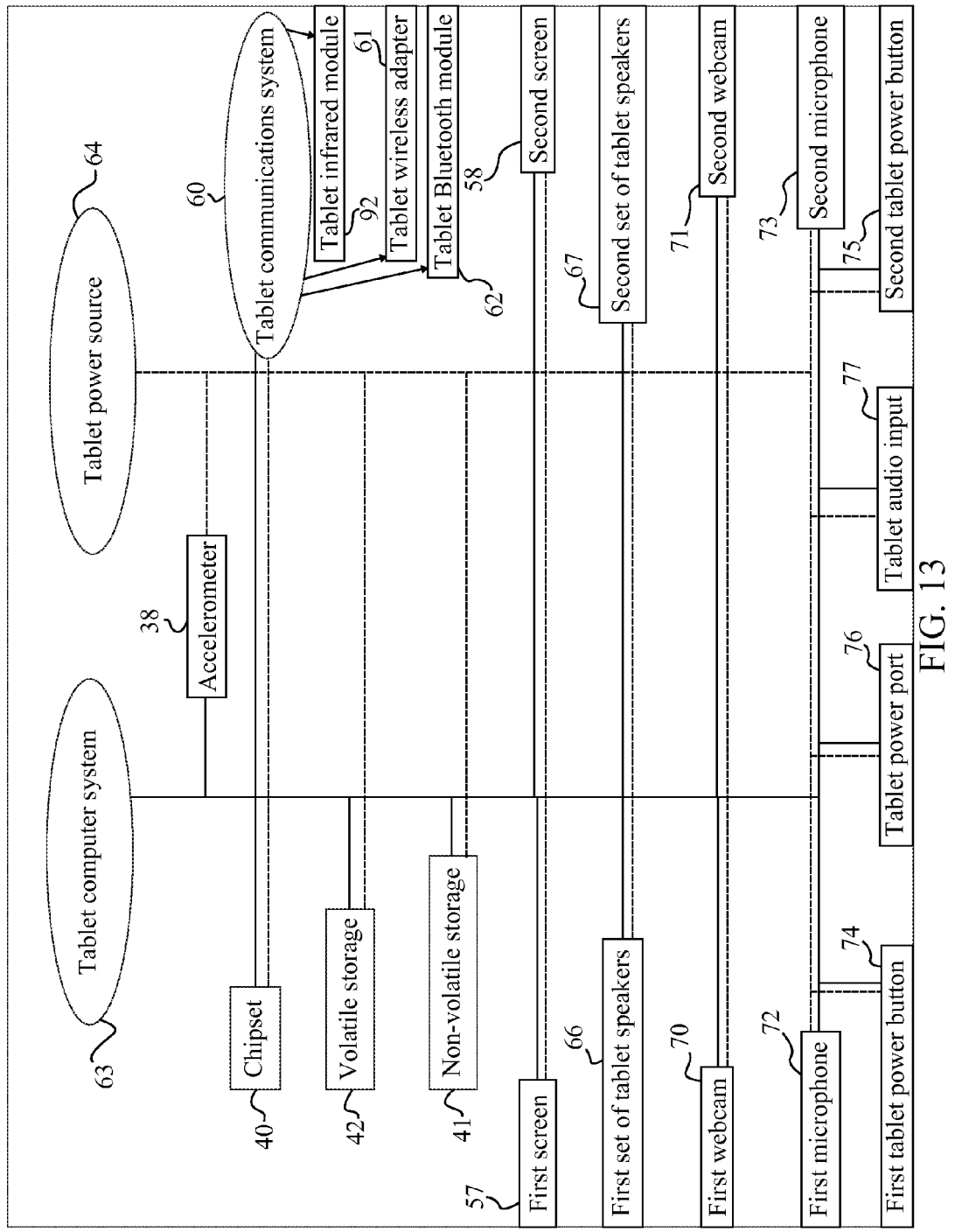
FIG. 13 is a graphic showing electrical and electronic connections of another embodiment of the present invention.

The tablet 56 comprises a first screen 57, a second screen 58, a set of latching mechanisms 59, a tablet communications system 60, a tablet computer system 63, and a tablet power source 64. The first screen 57 and second screen 58 are connected to each other, facing opposite directions. That is, the orientation of the first screen 57 is 180 degrees from the orientation of the second screen 58. As with the preferred embodiment, the first screen 57 and second screen 58 have capacitive touch interfaces. The latching mechanisms 59 are positioned on the side faces of the tablet 56, which allows them to engage with the latch receptions 84 on the tablet housing 78. The latching mechanisms 59 are preferably spring locks, which lock by extending through aligned holes along the tablet housing 78. The latching mechanisms 59 can be disengaged simply by pushing them into the tablet 56, allowing the tablet 56 to be slid out of the tablet housing 78. Like the preferred embodiment, the tablet computer system 63 includes a chipset 40, a volatile storage 42, and a non-volatile storage 41, seen in FIG. 13. Also shown in FIG. 13, the tablet communications system 60 is more basic, including only a tablet wireless adapter 61, a tablet Bluetooth module 62, and a tablet infrared module 92. The tablet infrared module 92 allows the tablet 56 to interact with numerous devices, such as televisions, effectively serving as a universal remote. By means of the tablet infrared module 92, the tablet 56 will be able to interact with and control any appropriately equipped devices, such as televisions, set-top boxes, and even lights or microwaves. The tablet computer system 63, like the standard computer system 39, runs an operating system which can be selected from a variety of options such as OSX®, Windows®, and Android™. The tablet power source 64 provides power to the tablet computer system 63 as well as the first screen 57 and the second screen 58. The tablet computer system 63 is in communication with the first screen 57 and the second screen 58, and is also electronically connected to the other components, such as the set of connection ports 12 and the input device 11, located in the ear covers 1.

The tablet 56 also includes a tablet bezel 65, a first set of tablet speakers 66, a second set of tablet speakers 67, a first protective cover 68, a second protective cover 69, a first webcam 70, a second webcam 71, a first microphone 72, a second microphone 73, a first tablet power button 74, a second tablet power button 75, an accelerometer 38, a tablet power port 76, and a tablet audio input 77. The first protective cover 68 is removably attached to the first screen 57 while the second protective cover 69 is removably attached to the second screen 58. These protectors are clear so that they do not interfere with a user's view of the displays. Although in the preferred embodiment the tablet 56 is curved, the first screen 57 and second screen 58 are essentially mirror images of each other. The location of the second set of tablet speakers 67, second protective cover 69, second webcam 71, second microphone 73, and second tablet power button 75 are identical to the corresponding components of the first screen 57. The tablet bezel 65 contains the first screen 57 and the second screen 58, similar to the bezel 34 of the screen 33 in the preferred embodiment. Positioned on the tablet bezel 65 on the same side as the first screen 57 is the first set of tablet speakers 66, the first webcam 70, the first microphone 72, and the first tablet power button 74. The first set of tablet speakers 66 preferably includes six individual units, with two evenly spaced across the upper face of the tablet bezel 65, another two matching units evenly spaced across the lower face of the tablet bezel 65, with the left and right bezel 34 faces having a single centered individual unit. The first webcam 70 and the first microphone 72 are integrated into the center of the lower face of the tablet bezel 65, while the first tablet power button 74 is correspondingly placed on the upper face of the tablet bezel 65. The second set of tablet speakers 67, the second webcam 71, the second microphone 73, and the second tablet power button 75 are positioned on the tablet bezel 65 adjacent to the second screen 58, forming a mirror edge of the corresponding components adjacent to the first screen 57. The arrangement of the first set of tablet speakers 66 and second set of tablet speakers 67 is useful for surround sound, and if the tablet 56 is connected to the ear covers then the speakers 8 of the ear covers 1 can be used in conjunction with the first set of tablet speakers 66 and second set of tablet speakers 67 to further enhance a surround sound experience.

The first set of tablet speakers 66, second set of tablet speakers 67, first protective cover 68, second protective cover 69, first webcam 70, second webcam 71, first microphone 72, second microphone 73, first tablet power button 74, second tablet power button 75, and tablet audio input 77 are each powered by the tablet power source 64 and in communication with the tablet computer system 63, just as their corresponding parts interact with the power source 51 and computer system 39 of the preferred embodiment. The first tablet power button 74 and second tablet power button 75 are also in communication with the first screen 57 and second screen 58, respectively, allowing the first screen 57, second screen 58, or both to be turned on and off.

The tablet power port 76 and tablet audio input 77 are positioned on the bottom face of the tablet bezel 34, perpendicular to both the first screen 57 and the second screen 58. The tablet power port 76 and tablet audio input 77 allow the table to be attached to the charging dock 52, which can serve a stand for the tablet 56 and charge the tablet power source 64 when the tablet 56 is being used independently. The tablet power port 76 and tablet audio input 77 receive a matching power port connector 54 and audio connector 55 located on the base 53 of the charging dock 52. When attached to the charging dock 52, the tablet 56 will stand upright such that the first screen 57 and the second screen 58 can still be viewed by a user.

Figure 5:
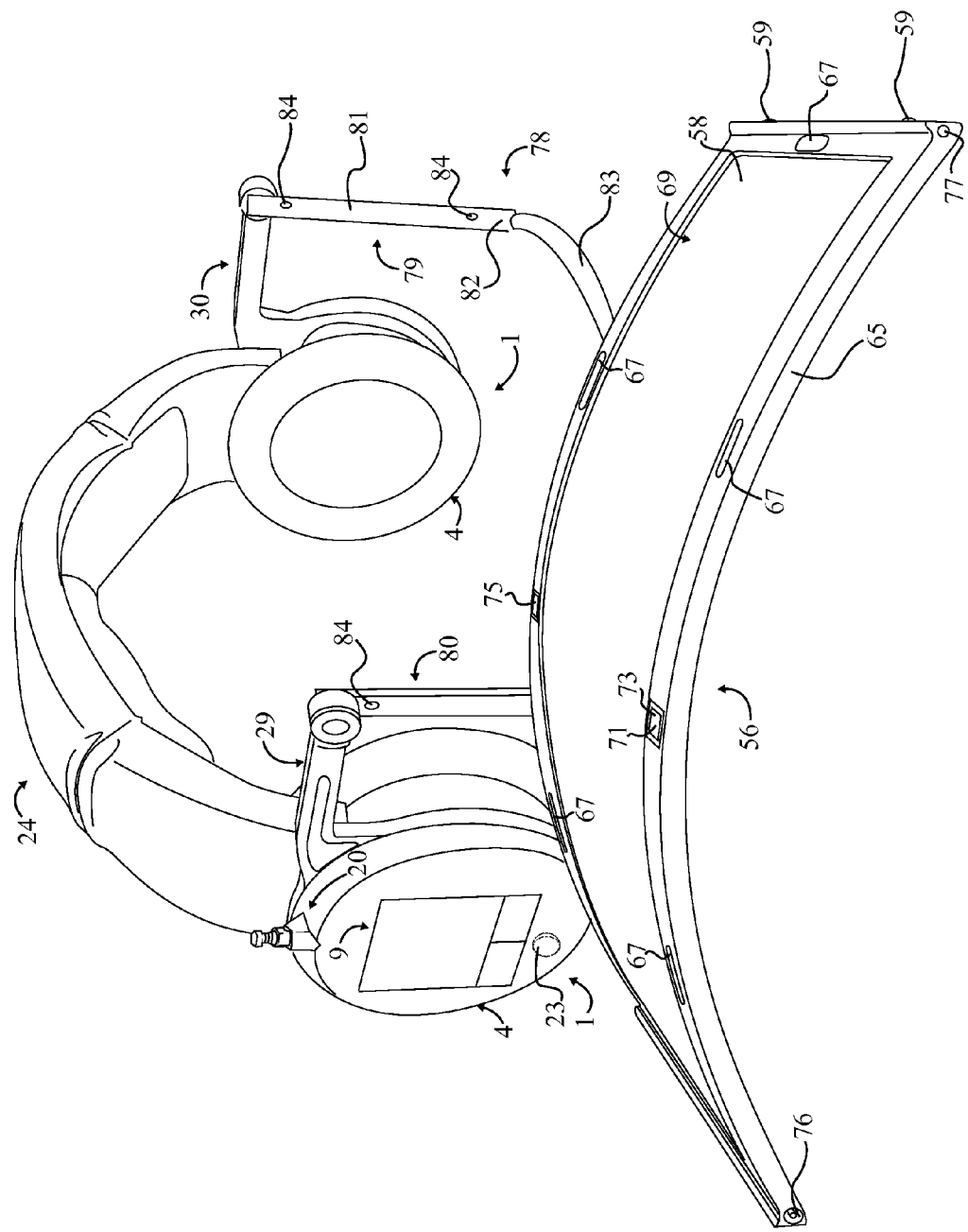
FIG. 5 is a perspective view of the detached components of another embodiment of the present invention.

Visible in FIG. 5, the tablet housing 78 comprises a set of access holes 86, a first vertical bar 79, a second vertical bar 80, a bottom support bar 83, and a plurality of latch receptions 84. The bottom support bar 83 is connected to a base end 82 of the first vertical bar 79 and the second vertical bar 80. Located on the interior face of first vertical bar 79 and the second vertical bar 80 is a interior channel 81. The interior channel 81 traverses into the bar, terminating adjacent to the base end 82. Located on the interior of the first side bar and second side bar are latch receptions 84. The latch receptions 84 engage with the latching mechanisms to secure the tablet 56 to the tablet housing 78. The latch receptions 84 are preferably small holes in the first vertical bar 79 and the second vertical bar 80 that receive the spring locks.

Figure 9:
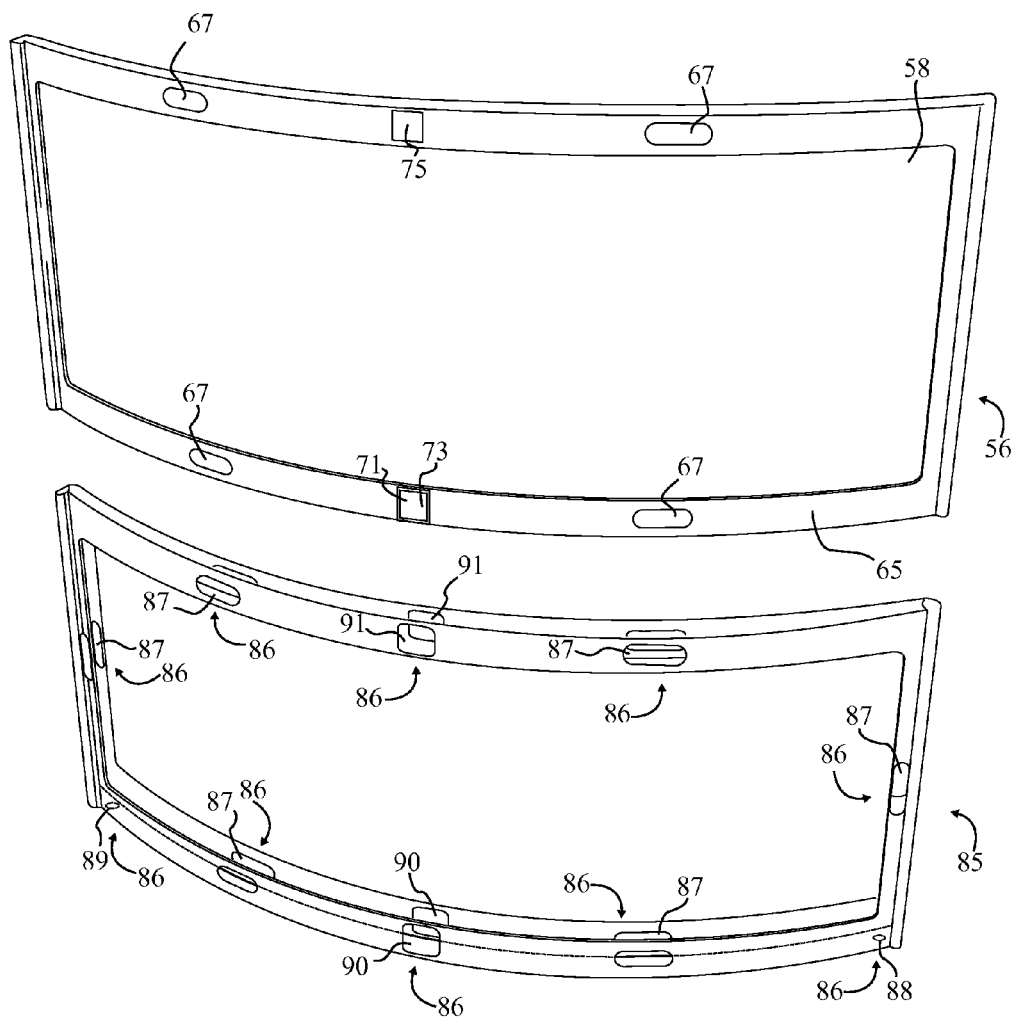
FIG. 9 is a perspective view of the present invention and another accessory of the present invention.

In addition to the tablet housing 78, two accessory components are provided for this other embodiment. A tablet case 85, as illustrated in FIG. 9, is designed to receive the tablet 56, allowing the tablet 56 to slide in through an opening of the tablet case 85. The tablet case 85 comprises a set of access holes 86, which further comprise a plurality of speaker openings 87, an audio opening 88, a power opening 89, a set of video openings 90, and a set of power button openings 91. The set of access holes 86 allow a user to access certain features of the table while the tablet 56 is placed in the tablet case 85. Specifically, the plurality of speaker openings 87 are aligned with the first set of tablet speakers 66 and the second set of tablet speakers 67. Similarly, the audio opening 88 is aligned with the tablet 56 audio port and the power opening 89 is aligned with the tablet power port 76. Likewise, the set of video openings 90 and set of power button openings 91 allow users to access and manipulate the first webcam 70, second webcam 71, first microphone 72, second microphone 73, first tablet power button 74, and second tablet power button 75. Overall, this tablet case 85 gives users a choice of colors and designs to choose from if they do not care for the standard colors. The set of access holes 86 mean that the audio system and ports of the tablet 56 can still be used when the tablet 56 is placed in the tablet case 85. The set of access holes 86 therefore allow a user to make full use of the tablet 56 even when the tablet 56 is held in the tablet case 85.

Figure 8:
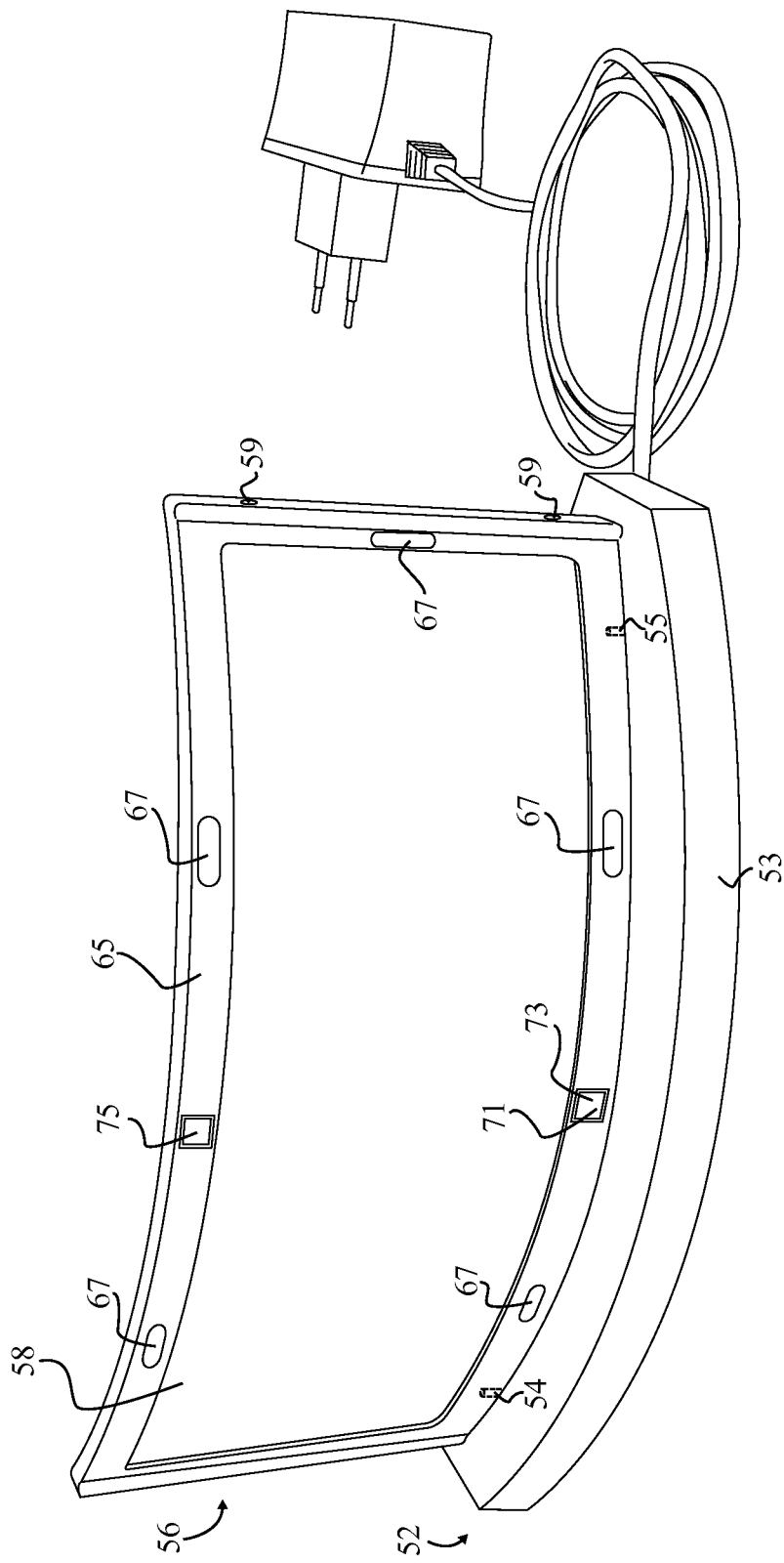
FIG. 8 is a perspective view of the present invention and accessory of the present invention.

A charging dock 52 comprises a base 53, a power port connector 54, and an audio connector 55, depicted in FIG. 8. The charging dock 52 serves two purposes, acting as a stand for the tablet 56 as well as charging the tablet 56. The base 53 has a curved shape designed to match the curve of the tablet 56, with the power port connector 54 and the audio connector 55 being positioned on opposite ends of the base 53. The power port connector 54 and the audio connector 55 are perpendicular to the base 53, such that they engage with the tablet power port 76 and the tablet audio input 77 when the tablet 56 is placed on the charging dock 52. The power port connector 54 and the audio connector 55 are located so that they are aligned with the tablet power port 76 and the tablet audio input 77, allowing the tablet 56 to be used independently while still being powered. The charging dock has a power plug connected to the base 53. The power plug interfaces with standard wall sockets, providing power to the charging dock 52, and thus the attached tablet 56. The charging dock 52 could also include a dock sound system, which plays audio received from the tablet 56.

In this other embodiment the entire present invention is given a black color, such that the features blend in with each other. This black color theme serves to enhance the visual appeal of the present invention.

In other embodiments a variety of accessory devices could enhance the functionality of the present invention. One potential accessory device is a controller, usable with the second embodiment, a handheld dock that would receive and hold the tablet 56 in a central area, between a base support and two side supports. The overall shape of the handheld dock would be very similar to the tablet housing 78, with the tablet 56 resting on the base support and being secured between the two side supports. The handheld dock would include interface sections on each side, with the interface sections including buttons, triggers, and analog sticks, similar to traditional video game controllers. The handheld dock would provide a user with a superior interface for playing video games on the tablet 56. Potentially, the handheld dock could also include an extra battery to extend the battery life of the tablet 56. With either embodiment, a laser keyboard could be positioned on the exterior side of the screen 33 or on the first screen bar 29 or second screen bar 30. The laser keyboard would create a virtual keyboard on a flat surface, allowing a user to type with the present invention without the need to carry around a keyboard. An interior light could be positioned on the interior side of the screen 33, first screen bar 29, or second screen bar 30 and used to provide interior lighting when the present invention is in use. Additionally, an exterior light could be positioned on the exterior side of the screen 33. The exterior light would allow a user to better see their surroundings when using the present invention in low light conditions, such as during a nighttime stroll. An exterior camera system, including a front exterior camera and a rear exterior camera, could also be added. The front exterior camera would face away from the present invention, in a forward or backwards direction. The exterior cameras would then allow a user to see video footage from their front and backsides, outputting footage to the display. The front exterior camera could allow a user to continue using the present invention while mobile, navigating obstacles by viewing the feed from the front exterior camera. The exterior cameras could also be given low-light or thermal viewing capabilities, allowing the cameras to be used in a wider variety of situations. As well as providing video capabilities, the exterior cameras would function as regular cameras, being capable of taking pictures. Another possible addition is a security device to limit access to the present invention. The security device could be a thumbprint reader or utilize a more intricate method, such as retinal scans. Other possible inclusions include power indicators and temperature sensors. In general a wide variety of accessory devices can be added to enhance the utility of the present invention without interfering with the intended function.

In the future the present invention will also be able to make use of new standards and technologies as they develop. For example, cell phone communications standards have evolved from 3G, to 4G, and eventually new standards such as 5G will be introduced. Visual and audio technologies are also advancing, with the concept of 5D recently having been introduced. As these and other new technologies develop, the present invention will be able to incorporate them as well as the necessary components.

Although the invention has been explained in relation to its preferred embodiment, it is to be understood that many other possible modifications and variations can be made without departing from the spirit and scope of the invention as hereinafter claimed.

What is claimed is:

1. A headset with adjustable display and integrated computing system comprises,
   a pair of ear covers comprises a first ear cover and a second ear cover;
   the first ear cover and second ear cover each comprise an enclosure, an annular screen rail, a speaker, a control interface, and a set of connection ports;
   the speaker being positioned on the enclosure opposite the control interface;
   the annular screen rail being positioned on the enclosure between the speaker and the control interface;
   the annular screen rail being positioned around the enclosure;
   the set of connection ports being positioned on the enclosure adjacent to the annular screen rail around the enclosure;
   the annular screen rail comprises a track and a guide slider;
   the guide slider being movably engaged with the track;
   a first screen bar and a second screen bar;
   the first screen bar and the second screen bar each comprise a support end and a screen end;
   the support end of the first screen bar being connected to the guide slider of the first ear cover;
   the support end of the second screen bar being connected to the guide slider of the second ear cover;
   a screen, wherein the screen is preferably a capacitive touch screen;
   a computer system, wherein the computer system runs an operating system;
   a communications system;
   a power source;
   the adjustable support band being connected to the enclosure of the first ear cover and the enclosure of the second ear cover;
   the first screen bar being movably engaged with the annular screen rail of the first enclosure;
   the second screen bar being movably engaged with the annular screen rail of the second enclosure;

the screen end sleeving into the support end;
the screen being rotatably attached to the screen end of the first screen bar;
the screen being rotatably attached to the screen end of the second screen bar;
the set of connection ports being electrically connected to the power source;
and the set of connection ports being electronically connected to the computer system;
the power source being electrically connected to the screen, the computer system and the communications system;
the computer system being electronically connected to the communications system and the screen;
the first ear cover and second ear cover each comprise an antenna;
the control interface comprises an input housing and an input device;
the antenna being rotatably connected to the enclosure adjacent to the annular screen rail;
the antenna traversing into the enclosure;
the input housing being recessed into the enclosure;
the input device being positioned in and attached to the input housing;
the speaker, antenna, and input device each being electrically connected to the power source;
the speaker, antenna, and input device each being electronically connected to the computer system;
a power button being positioned on the enclosure of the first ear cover adjacent to the input housing;
the power button being electronically connected to the computer system and the screen;
the adjustable support band comprises a main section, a first end section, and a second end section;
the main section comprises a main rail;
the main rail laterally traversing through the main section;
the first end section being connected to the main section by the main rail;
the second end section being connected to the main section by the main rail opposite the first end section;
the first end section and the second end section each being slidably engaged with the main rail;
the first end of the adjustable support band being connected to the first ear cover; and
the second end of the adjustable support band being connected to the second ear cover.

2. The headset with adjustable display and integrated computing system as claimed in claim 1 comprises,
the set of connection ports of the first ear cover comprises a first Universal Serial Bus (USB) input, a High-Definition Multimedia Interface (HDMI) input and an audio input; and
the set of connection ports of the second ear cover comprises a second USB input, an Ethernet input, a power port, and a Secure Digital (SD) card slot.

3. The headset with adjustable display and integrated computing system as claimed in claim 1 comprises,
the screen comprises a bezel, a protective cover, a webcam, a microphone, and an accelerometer;
the protective cover being attached across the screen;
the webcam and the microphone each being positioned on the bezel adjacent to the protective cover, and the webcam is located at the bottom section of the screen;
the accelerometer being housed within the screen;
the power source being electrically connected to the webcam and the microphone; and
the computer system being electronically connected to the webcam and the microphone.

4. The headset with adjustable display and integrated computing system as claimed in claim 1 comprises,
the computer system comprises a chipset, a non-volatile storage, and a volatile storage, wherein the operating system is stored on the non-volatile storage;
the computer system being housed within the pair of ear covers;
the communications system comprises a wireless network adapter, a wireless display module, a Bluetooth module, a satellite transceiver, a cellular antenna, a mobile broadband module, and an Advanced Television Systems Committee (ATSC) receiver;
the communications system being housed within the pair of ear covers;
the ATSC receiver being electronically connected to the antenna of the first ear cover; and
the satellite transceiver being electronically connected to the antenna of the second ear cover.

5. A headset with adjustable display and integrated computing system comprises,
a pair of ear covers comprises a first ear cover and a second ear cover;
the first ear cover and second ear cover each comprise an enclosure, an annular screen rail, a speaker, a control interface, a set of connection ports, and an antenna;
an adjustable support band;
a first screen bar and a second screen bar;
the first screen bar and the second screen bar each comprise a support end and a screen end;
a tablet housing;
a tablet comprises a first screen, a second screen, a set of latching mechanisms, a tablet communications system, a tablet computer system, and a tablet power source, wherein the tablet computer system runs a tablet operating system and the first screen and the second screen are preferably capacitive touch screens, the first screen and second screen are essentially minor images of each other;
a computer system, wherein the computer system runs an operating system;
a communications system;
a power source;
the adjustable support band being connected to the enclosure of the first ear cover and the enclosure of the second ear cover;
the first screen bar being movably engaged with the annular screen rail of the first enclosure;
the second screen bar being movably engaged with the annular screen rail of the second enclosure;
the screen end sleeving into the support end;
the tablet housing being rotatably attached to the screen end of the first screen bar;
the tablet housing being rotatably attached to the screen end of the second screen bar;
the tablet being attached to and slidably engaged with the tablet housing;
the power source being electrically connected to the screen, the computer system and the communications system;
the tablet power source being electrically connected to the first screen, the second screen, the tablet computer system, and the tablet communication system;
the computer system being electronically connected to the communications system and the screen;

the tablet computer system being electronically connected to the tablet communications system, the first screen, and the second screen;
the set of connection ports of the first ear cover comprises a first Universal Serial Bus (USB) input, a High-Definition Multimedia Interface (HDMI) input and an audio input;
the set of connection ports of the second ear cover comprises a second USB input, an Ethernet input, a power port, and a Secure Digital (SD) card slot;
a charging dock;
a tablet case comprises a set of access holes;
the tablet further comprises a tablet bezel, a first set of tablet speakers, a second set of tablet speakers, a first protective cover, a second protective cover, a first webcam, a second webcam, a first microphone, a second microphone, a first tablet power button, a second tablet power button, an accelerometer, a tablet power port, and a tablet audio input;
the accelerometer being housed within the tablet;
the first screen being positioned interior to the tablet bezel;
the second screen being positioned interior to the tablet bezel opposite and adjacent to the first screen;
the first set of tablet speakers being positioned on the tablet bezel adjacent to the first screen;
the second set of tablet speakers being positioned on the tablet bezel adjacent to the second screen;
the set of latching mechanisms being positioned exteriorly along the tablet bezel between the first screen and the second screen;
the power source being electrically connected to the tablet power port, the first set of tablet speakers, the second set of tablet speakers, the first webcam, the second webcam, the first microphone, and the second microphone;
the tablet computer system being electronically connected to the tablet audio port, the first set of tablet speakers, the second set of tablet speakers, the first webcam, the second webcam, the first microphone, and the second microphone , the first tablet power button, and the second tablet power button;
the first screen being electronically connected to the first tablet power button;
the second screen being electronically connected to the second tablet power button;
the computer system and the tablet computer system each comprise a chipset, a non-volatile storage, and a volatile storage, wherein the operating system is stored on the non-volatile storage of the computer system and the tablet operating system is stored on the non-volatile storage of the tablet computer system;
the computer system being housed within the pair of ear covers;
the tablet computer system being housed within the tablet;
the communications system comprises a wireless network adapter, a wireless display module, a Bluetooth module, a satellite transceiver, a cellular antenna, a mobile broadband module, and an Advanced Television Systems Committee (ATSC) receiver;
the communications system being housed within the pair of ear covers;
the ATSC receiver being electronically connected to the antenna of the first ear cover;
the satellite transceiver being electronically connected to the antenna of the second ear cover;
the tablet communications system comprises a tablet wireless adapter, a tablet Bluetooth module, and a tablet infrared module;
the tablet communications system being housed within the tablet;
the tablet housing comprises a first vertical bar, a second vertical bar, a bottom support bar, and a plurality of latch receptions;
the first and the second vertical bar each comprise a base end and an interior channel;
the first vertical bar being parallel to the second vertical bar;
the bottom support bar being perpendicularly connected to the base end of the first vertical bar and the base end of the second vertical bar;
the interior channel being positioned adjacent to the base end;
the tablet being flush with the interior channel of the first vertical bar and the interior channel of the second vertical bar;
the plurality of latch receptions being positioned along the interior channel of the first vertical bar and the second vertical bar; and
the plurality of latch receptions being engaged with the set of latching mechanisms, wherein the tablet is secured to the tablet housing.

6. The headset with adjustable display and integrated computing system as claimed in claim 5 comprises,
the speaker being positioned on the enclosure opposite the control interface;
the annular screen rail being positioned on the enclosure between the speaker and the control interface;
the annular screen rail being positioned around the enclosure;
the set of connection ports being positioned on the enclosure adjacent to the annular screen rail around the enclosure;
the annular screen rail comprises a track and a guide slider;
the guide slider being movably engaged with the track;
the support end of the first screen bar being connected to the guide slider of the first ear cover; and
the support end of the second screen bar being connected to the guide slider of the second ear cover.

7. The headset with adjustable display and integrated computing system as claimed in claim 5 comprises,
the first ear cover and second ear cover each comprise an antenna;
the control interface comprises an input housing and an input device;
the antenna being rotatably connected to the enclosure adjacent to the annular screen rail;
the antenna traversing into the enclosure;
the input housing being recessed into the enclosure;
the input device being positioned in and attached to the input housing;
the speaker, antenna, and input device each being electrically connected to the power source;
the speaker, antenna, and input device each being electronically connected to the computer system and the tablet computer system;
a power button being positioned on the enclosure of the first ear cover adjacent to the input housing; and
the power button being electronically connected to the computer system.

8. The headset with adjustable display and integrated computing system as claimed in claim 5 comprises,
the set of connection ports being electrically connected to the power source; and
the set of connection ports being electronically connected to the computer system and the tablet computer system.

9. The headset with adjustable display and integrated computing system as claimed in claim 5 comprises,
- the adjustable support band comprises a main section, a first end section, and a second end section;
- the main section comprises a main rail;
- the main rail laterally traversing through the main section;
- the first end section being connected to the main section by the main rail;
- the second end section being connected to the main section by the main rail opposite the first end section;
- the first end section and the second end section each being slidably engaged with the main rail;
- the first end of the adjustable support band being connected to the first ear cover; and
- the second end of the adjustable support band being connected to the second ear cover.

10. The headset with adjustable display and integrated computing system as claimed in claim 5 comprises,
- the charging dock comprises a base, a power port connector and an audio connector;
- the power port connector and the audio connector being positioned on the base;
- the power port connector and the audio connector being positioned perpendicular to the base; and
- the power port connector being aligned with the tablet power port and the audio connector being aligned with the tablet audio input, wherein the tablet power port receives the power port connector and the tablet audio input receives the audio connector.

11. The headset with adjustable display and integrated computing system as claimed in claim 5 comprises,
- the set of access holes comprise a plurality of speaker openings, an audio opening, a power opening, a set of video openings, and a set of power openings;
- the plurality of speaker openings being aligned with the first set of tablet speakers and the second set of tablet speakers;
- the audio opening being aligned with the tablet audio input;
- the power opening being aligned with the tablet power port;
- the set of video openings being aligned with the first webcam, the second webcam, the first microphone, and the second microphone; and
- the set of power openings being aligned with the first tablet power button and the second tablet power button.

12. The headset with adjustable display and integrated computing system as claimed in claim 5 comprises, the first protective cover being attached across the first screen;
- the second protective cover being attached across the second screen;
- the tablet power port and the tablet audio port being positioned exteriorly on the tablet bezel between the first screen and the second screen;
- the first webcam being positioned on the tablet bezel adjacent to the first screen;
- the first microphone being positioned on the tablet bezel adjacent to the first screen and the first webcam;
- the first tablet power button being positioned on the tablet bezel adjacent to the first screen and opposite the first webcam;
- the second webcam being positioned on the tablet bezel adjacent to the second screen;
- the second microphone being positioned on the tablet bezel adjacent to the second screen and the second webcam; and
- the second tablet power button being positioned on the tablet bezel adjacent to the second screen and opposite the second webcam.

\* \* \* \* \*